No. 777,949. PATENTED DEC. 20, 1904.
C. GELNAY.
BELT SHIFTER.
APPLICATION FILED FEB. 26, 1904.
NO MODEL. 2 SHEETS—SHEET 1.
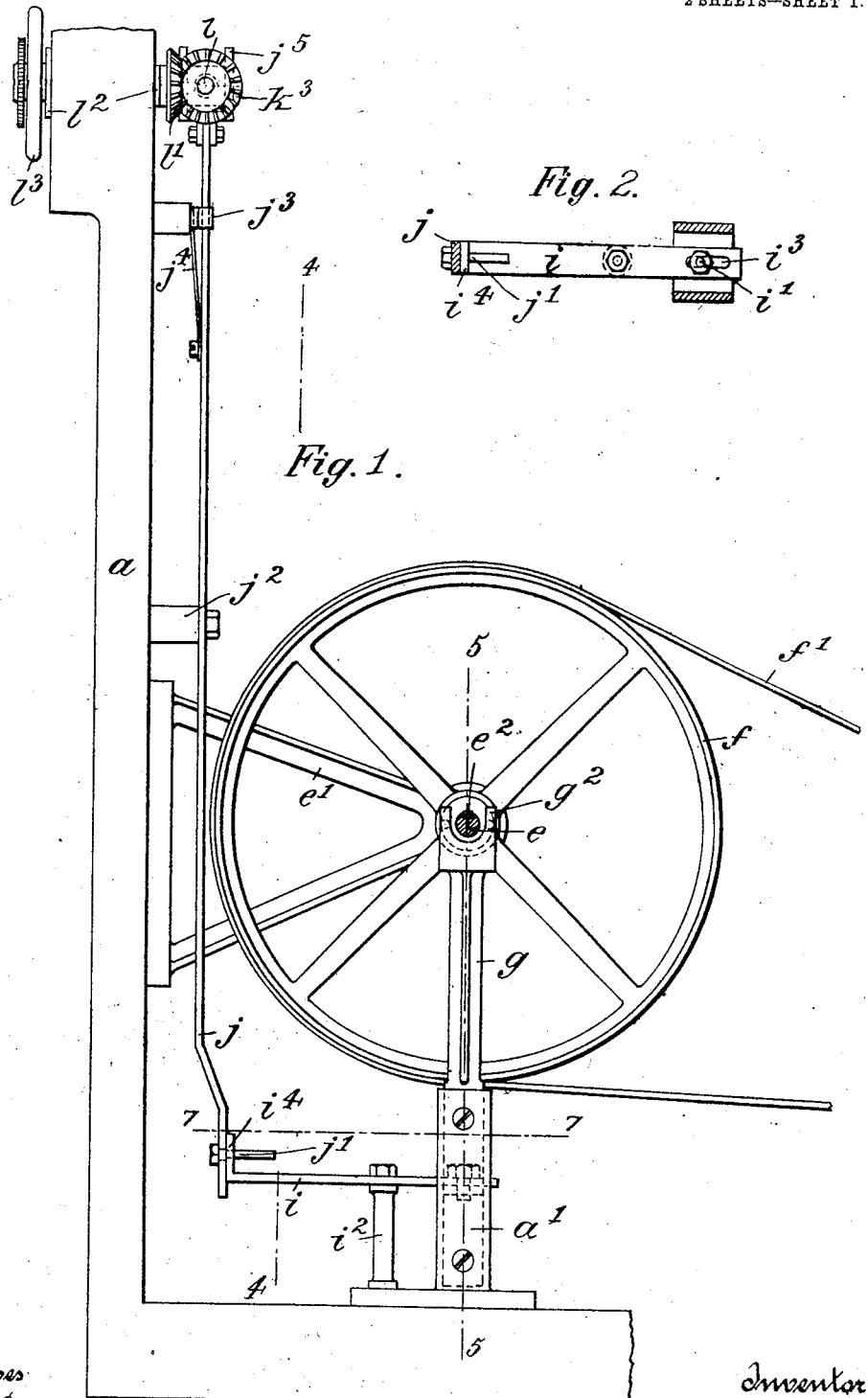

No. 777,949. PATENTED DEC. 20, 1904.
C. GELNAY.
BELT SHIFTER.
APPLICATION FILED FEB. 26, 1904.
NO MODEL. 2 SHEETS—SHEET 2.
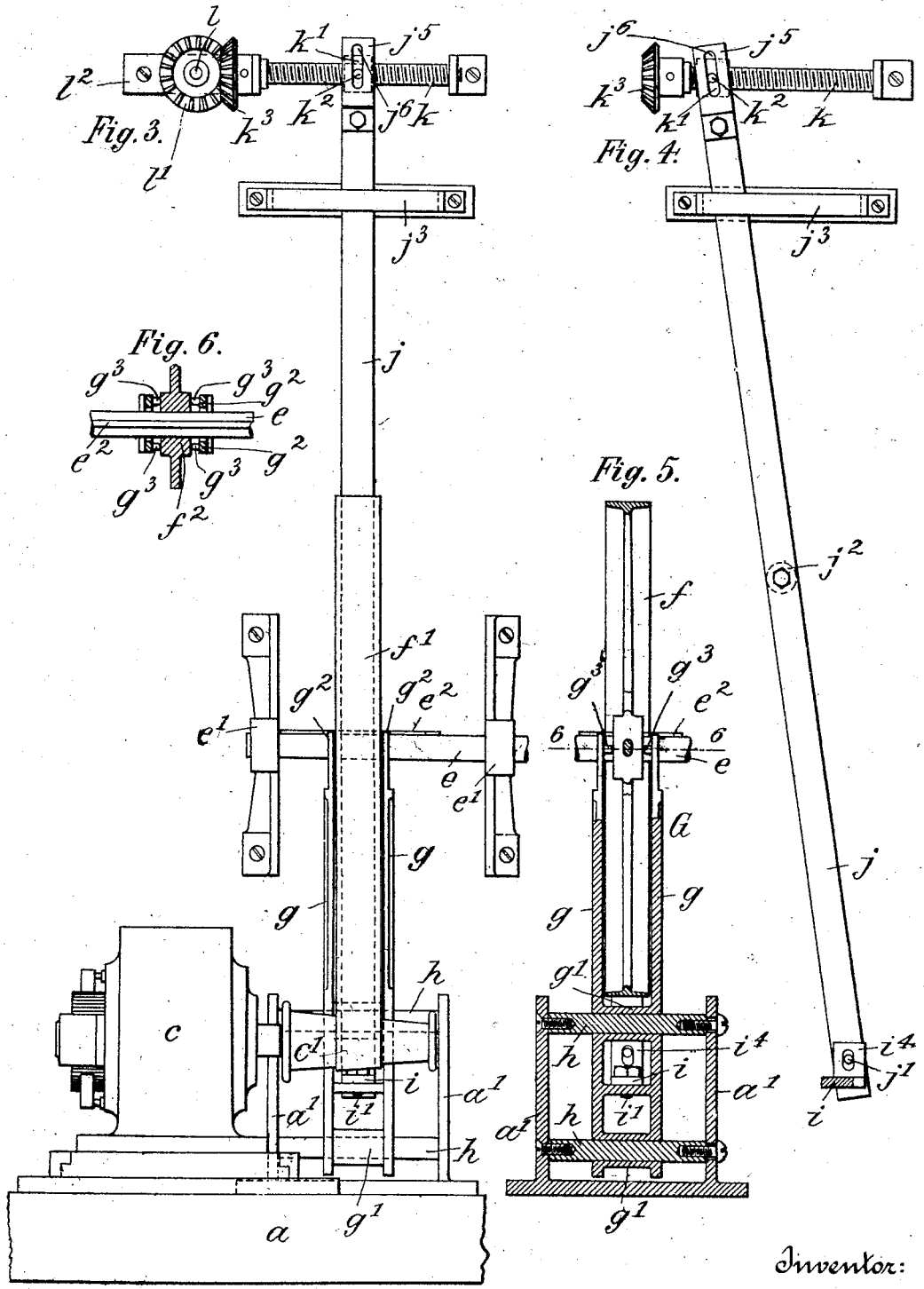

No. 777,949.

Patented December 20, 1904.

UNITED STATES PATENT OFFICE.

CHARLES GELNAY, OF NEW YORK, N. Y.

BELT-SHIFTER.

SPECIFICATION forming part of Letters Patent No. 777,949, dated December 20, 1904.

Application filed February 26, 1904. Serial No. 195,347.

*To all whom it may concern:*

Be it known that I, CHARLES GELNAY, a citizen of Austria-Hungary, residing at New York city, (Manhattan,) county and State of New York, have invented new and useful Improvements in Belt-Shifters, of which the following is a specification.

This invention relates to a belt-shifter for varying the speed transmitted from the cone-pulley of a motor to the power-shaft.

The belt-shifter is particularly designed for regulating the speed of the pin-barrel in an autopneumatic musical instrument, but may also be applied to other purposes.

In the accompanying drawings, Figure 1 is a front view of my improved belt-shifter; Fig. 2, a horizontal section on line 7 7, Fig. 1; Fig. 3, a side view of the belt-shifter; Fig. 4, a vertical section on line 4 4, Fig. 1, showing the parts in a different position; Fig. 5, a vertical section on line 5 5, Fig. 1; and Fig. 6 a cross-section on line 6 6, Fig. 5.

The letter $e$ represents a power-shaft the speed of which is to be regulated and which is journaled in bearings $e'$. Upon shaft $e$ is slidably mounted a pulley $f$, having a grooved hub $f^2$, which engages a feather $e^2$ of shaft $e$. The pulley $f$ receives motion by belt $f'$ from a coniform driving-pulley $c'$ of electromotor $c$. The pulley $f$ is adapted to be shifted along shaft $e$ to correspondingly shift belt $f'$ along cone-pulley $c'$, and thus vary the speed transmitted from the motor to shaft $e$. To this effect the pulley $f$ is flanked by a pair of upright arms $g$, connected by tubular sleeves $g'$, the whole constituting a slidable frame G. The upper ends of arms $g$ are formed, as at $g^2$, to straddle shaft $e$ and are provided with pins $g^3$, that bear against the hub $f^2$ of pulley $f$. The frame G, besides thus embracing the lower half of pulley $f$, also embraces the lower run of belt $f'$, so that a lateral movement of the frame shifts the belt as well as the pulley. The frame G is slidably supported upon a pair of transverse guide-rods $h$, passing through sleeves $g'$ and secured to a pair of standards $a'$ of a frame $a$. In order to shift frame G, it is pivotally connected at $i'$ to one end of a shipping-lever $i$, fulcrumed to a post $i^2$ and having slot $i^3$ for reception of pivot $i'$, Fig. 2.

The other end of lever $i$ is turned up to form a lug $i^4$, slotted for the reception of a pin $j'$. This pin projects from the lower end of a transmission-lever $j$, turning on post $j^2$. This lever is guided in a slotted bearing $j^3$ and is influenced by a spring $j^4$, which serves to hold the lever under tension. The upper end $j^5$ of lever $j$ is provided with a slot $j^6$ opposite a nut $k'$, mounted on a worm $k$. From the nut $k'$ projects a pin $k^2$, which enters the slot $j^6$, and thus serves to transmit the motion of the nut to the lever $j$. The worm $k$ is by bevel-wheels $k^3$ $l'$ intergeared with a shaft $l$, turning in bearings $l^2$ of frame $a$ and carrying hand-wheel $l^3$. If the hand-wheel is turned in one direction, it will by bevel-wheels $l'$ $k^3$, worm $k$, nut $k'$, levers $j$ $i$, and frame G move the pulley $f$ and belt $f'$ to the right, so as to cause the latter to engage the reduced end of cone-pulley $c'$. In this way the motion imparted by the electromotor to the shaft $e$ will be reduced. If the hand-wheel is turned in the opposite direction, the belt $f'$ is in like manner shifted to the left to engage the enlarged end of cone-pulley $c'$, and thus increase the speed imparted to shaft $e$.

What I claim is—

1. In a belt-shifter, the combination of a power-shaft with a pulley slidable thereon, a slidable frame embracing the pulley, a coniform driving-pulley, and a belt partly embraced by the slidable frame and connecting the pulleys, substantially as specified.

2. In a belt-shifter, the combination of a power-shaft having a feather, with a pulley slidable thereon and having a grooved hub, a forked slidable frame embracing the pulley, a coniform driving-pulley, and a belt partly embraced by the slidable frame and connecting the pulleys, substantially as specified.

3. In a belt-shifter, the combination of a power-shaft with a pulley slidable thereon, a slidable frame embracing the pulley, a shipping-lever engaging the frame, a transmission-lever pivoted to the shipping-lever, a nut engaging the transmission-lever, a worm engaging the nut, and means for rotating the worm, substantially as specified.

4. In a belt-shifter, the combination of a power-shaft with a pulley slidable thereon, a slidable frame having tubular sleeves and adapted to embrace the pulley, guide-rods engaging the sleeves, a coniform driving-pulley, and a belt partly embraced by the slidable frame and connecting the pulleys, substantially as specified.

Signed by me at New York city, (Manhattan,) New York, this 25th day of February, 1904.

CHARLES GELNAY.

Witnesses:
 FRANK V. BRIESEN,
 FRED. UNFRICHT.